United States Patent
Aster

(10) Patent No.: US 7,840,847 B1
(45) Date of Patent: Nov. 23, 2010

(54) SECTOR SHIFT READ CORRUPTION DETECTION

(75) Inventor: Radek Aster, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 465 days.

(21) Appl. No.: 11/944,142

(22) Filed: Nov. 21, 2007

(51) Int. Cl.
*G06F 11/00* (2006.01)
(52) U.S. Cl. .................. 714/42; 714/5; 714/30
(58) Field of Classification Search ........... 714/5, 714/25, 27, 30, 33, 42, 44, 52, 54
See application file for complete search history.

(56) References Cited

U.S. PATENT DOCUMENTS

| | | | | |
|---|---|---|---|---|
| 6,092,140 | A * | 7/2000 | Tausheck | 710/310 |
| 7,284,164 | B2 * | 10/2007 | Yoshida | 714/54 |
| 2004/0148543 | A1 * | 7/2004 | Eto et al. | 714/5 |
| 2005/0166084 | A1 * | 7/2005 | Yagisawa et al. | 714/6 |
| 2009/0106602 | A1 * | 4/2009 | Piszczek et al. | 714/42 |
| 2009/0125671 | A1 * | 5/2009 | Flynn et al. | 711/103 |

* cited by examiner

*Primary Examiner*—Robert Beausoliel
*Assistant Examiner*—Joseph D Manoskey
(74) *Attorney, Agent, or Firm*—Perkins Coie LLP

(57) ABSTRACT

A method and system are disclosed to quickly and inexpensively (in terms of computational overhead) detect when a data shift corruption event or a short read has occurred and to transparently retry the failed read operation. The method seeds the memory read buffer, into which read data will be written, by placing known values (a "seed pattern") at the end of the buffer prior to initiating the read operation. If the seed pattern is still in the read buffer when the read operation completes, the read operation has encountered a data shift corruption event and should be retried. If the read operation completes correctly, the seed pattern will be overwritten by the data read from the disk. The particular seed pattern used and the size of the seed pattern are chosen to be discriminating (i.e., no false positives) and cheap to write and verify (i.e., no performance impact).

27 Claims, 8 Drawing Sheets

SECTOR SHIFT READ CORRUPTION DETECTION

FIELD OF INVENTION

The present invention is related to computer storage systems, and more particularly, to a system and method for detecting a sector shift corruption during a read input/output operation.

BACKGROUND

A storage server (also known as a "filer") is a computer that provides storage services in both network attached storage (NAS) and storage area network (SAN) environments relating to the organization of information on storage devices, such as disks. The filer includes a storage operating system that implements a storage system to logically organize the information as a hierarchical structure of directories and files on the disks. Each "on-disk" file may be implemented as a set of disk blocks configured to store information, whereas the directory may be implemented as a specially-formatted file in which information about other files and directories are stored. A filer may be configured to operate according to a client/server model of information delivery to allow many clients to access files stored on the filer. In this model, the client may include an application, such as a file system protocol, executing on a computer that connects to the filer over a computer network. The computer network can include, for example, a point-to-point link, a shared local area network (LAN), a wide area network (WAN), or a virtual private network (VPN) implemented over a public network such as the Internet. Each client may request filer services by issuing file system protocol messages (in the form of packets) to the filer over the network.

A common type of file system is a "write in-place" file system, in which the locations of the data structures (such as inodes and data blocks) on disk are typically fixed. An inode is a data structure used to store information, such as metadata, about a file, whereas the data blocks are structures used to store the actual data for the file. The information contained in an inode may include information relating to: ownership of the file, access permissions for the file, the size of the file, the file type, and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is read from disk into memory and "dirtied" with new data, the data block is written to a new location on the disk to optimize write performance. A write-anywhere file system may initially assume an optimal layout, such that the data is substantially contiguously arranged on the disks. The optimal disk layout results in efficient access operations, particularly for sequential read operations. A particular example of a write-anywhere file system is the Write Anywhere File Layout (WAFL®) file system available from Network Appliance, Inc. The WAFL file system is implemented within a microkernel as part of the overall protocol stack of the filer and associated disk storage. This microkernel is supplied as part of Network Appliance's Data ONTAP® storage operating system, residing on the filer, that processes file service requests from network-attached clients.

As used herein, the term "storage operating system" generally refers to the computer-executable code operable on a storage system that manages data access. The storage operating system may, in case of a filer, implement file system semantics, such as the Data ONTAP® storage operating system. The storage operating system can also be implemented as an application program operating on a general-purpose operating system, such as UNIX® or Windows®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes. Each volume is associated with its own file system and as used herein, the terms "volume" and "file system" are interchangeable.

The disks within a volume can be organized as a Redundant Array of Independent (or Inexpensive) Disks (RAID). RAID implementations enhance the reliability and integrity of data storage through the writing of data "stripes" across a given number of physical disks in the RAID group, and the appropriate storing of parity information with respect to the striped data. In the example of a WAFL® file system, a RAID 4 implementation is advantageously employed, which entails striping data across a group of disks, and storing the parity within a separate disk of the RAID group. As described herein, a volume typically comprises at least one data disk and one associated parity disk (or possibly data/parity) partitions in a single disk arranged according to a RAID 4, or equivalent high-reliability, implementation.

During the execution of a disk read operation, a host bus adapter in a storage adapter transfers data from the disk storage interface to a host buffer memory in the storage adapter. Under certain conditions and in rare cases, the host bus adapter will mismanage the memory buffer pointers in such a way as to effectively drop a portion of the read data stream.

FIG. 1 illustrates the case of two data frames being received from a disk by the host bus adapter during a read operation. The two frames comprise a 15 sector read from disk and the data is to be written into six non-contiguous host memory buffers. Buffer #2, a 2048 byte buffer, spans the two frames in that the last three sectors of the first frame and the first sector of the second frame are to be written into it.

After completely receiving the first data frame, the pointer into buffer #2, as maintained by the host bus adapter, should be pointing at an offset three sectors into the buffer. Suppose that, because of a defect in the host bus adapter, when the adapter starts to receive the second frame it "forgets" the offset into buffer #2 and rewinds the pointer to begin at the start of the buffer. The resulting data placement would appear as shown in FIG. 2, as if the read data were shifted upwards by three sectors, with the last three sectors of host memory remaining unwritten. Another type of error can occur, wherein no data is read (this is known as a "short read").

In general terms, if there is a data stream that is to have a predetermined amount of data read into it (for example, 64K), the system will allocate 64K of buffer memory to hold the data to be read. The system operates under the assumption that when the read I/O is complete, the buffer will contain 64K of data, since that was the amount requested. If the buffer does not contain 64K of data for any reason, the system knows that there was an error. There is therefore a need to be able to detect data read errors where an allocated buffer memory is not completely filled by a read I/O.

Existing methods for detecting data corruption include the use of block-checksumming, which can be used to detect any kind of data corruption originating anywhere in the storage subsystem. However, recovering from data corruption is typically expensive and alarming to a user of the storage subsystem, because the subsystem usually assumes that the corruption has been caused by a fault in the disks themselves, and a typically recommended user action is to replace the supposedly faulty disk. In cases where there are known sources of corruption in the storage subsystem, e.g., in a host bus adapter, that are responsible for transient read corruption (such as the upward sector shift), it is advantageous to be able to quickly and cheaply detect that a transient read event occurred. A simple solution is to retry the failed I/O, instead of alerting upper layers of software to undergo an expensive recovery procedure and potentially target the wrong storage component (e.g., a disk) for replacement when such a replacement is not necessary.

SUMMARY

A method and system are disclosed to quickly and inexpensively (in terms of computational overhead) detect when a data shift corruption event or a short read has occurred and to transparently retry the failed read operation. The method seeds the memory read buffer, into which read data will be written, by placing known values (a "seed pattern") at the end of the buffer prior to initiating the read operation. If the seed pattern is still in the read buffer when the read operation completes, the read operation has encountered a data shift corruption event and should be retried. The assumption is that had the read operation completed correctly, the seed pattern would have been overwritten by the data read from the disk. The particular seed pattern used and the size of the seed pattern are chosen to be discriminating (i.e., no false positives) and cheap to write and verify (i.e., no performance impact).

BRIEF DESCRIPTION OF THE DRAWINGS

A more detailed understanding of the invention may be had from the following description of preferred embodiments, given by way of example, and to be understood in conjunction with the accompanying drawings, wherein.

DETAILED DESCRIPTION OF THE PREFERRED EMBODIMENTS

A method is disclosed to detect when a data shift corruption event or a short read has occurred, which results in an incorrect amount of data being read from a disk. The method seeds a buffer into which the read data will be written by placing known values (a "seed pattern") at the end of the buffer prior to reading the data from the disk. If the seed pattern is still in the buffer when the read operation completes, the read operation has encountered a data shift corruption event and should be retried. If the read operation completed correctly, the seed pattern would have been overwritten by the data read from the disk. The particular seed pattern used and the size of the seed pattern are chosen to minimize the possibility of falsely detecting a data shift corruption event and to minimize the performance impact of seeding the buffer.

Network Environment

Figure 3:
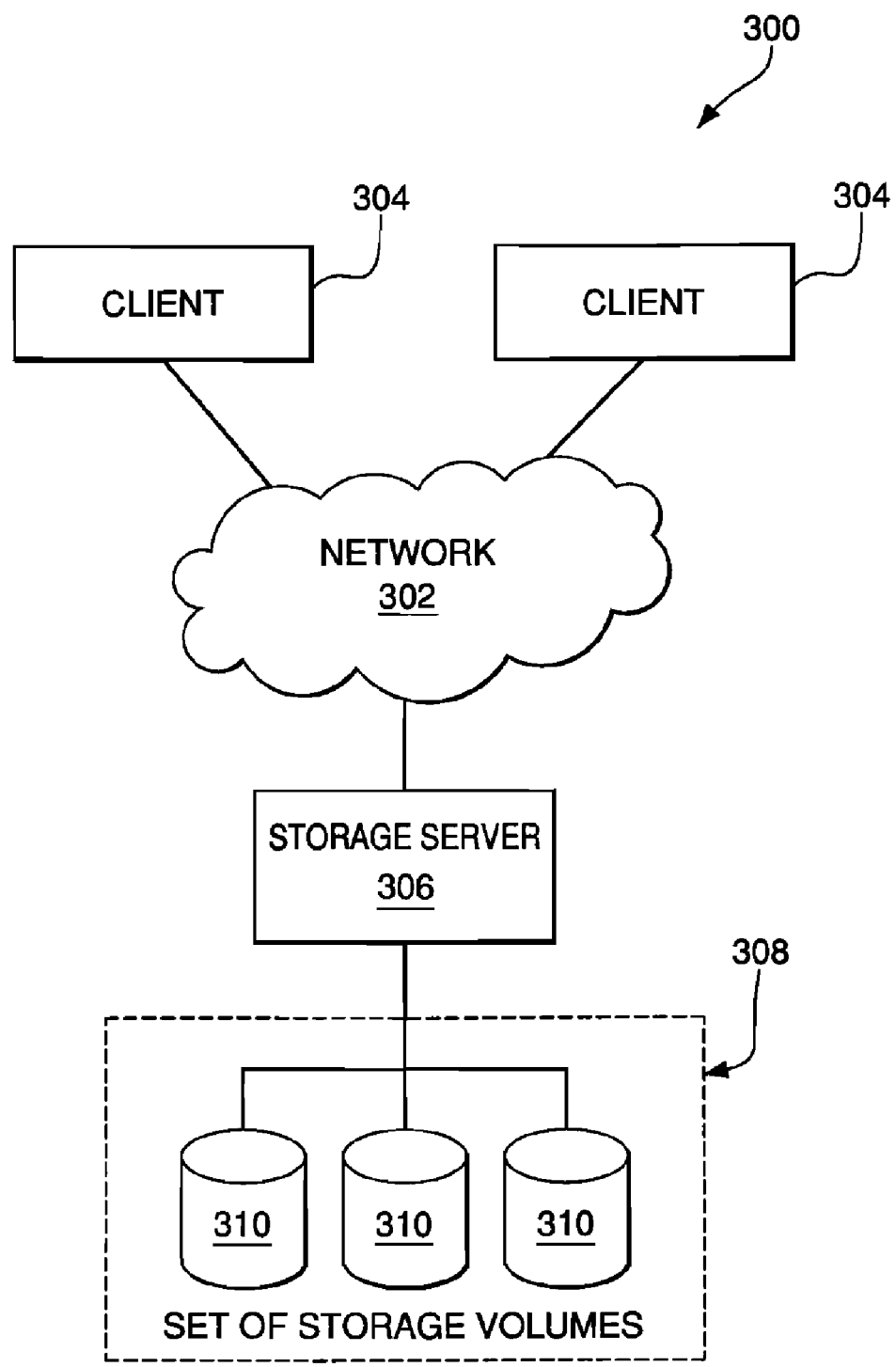
FIG. 3 is a block diagram of a network environment in which the present invention can be implemented.

FIG. 3 is a block diagram of an exemplary network environment 300 in which the principles of the present invention are implemented. The environment 300 is based around a network 302. The network 302 can be a local area network (LAN), a wide area network (WAN), a virtual private network (VPN) using communication links over the Internet, for example, or any combination of the three network types. For the purposes of this description, the term "network" includes any acceptable network architecture.

The network 302 interconnects a number of clients 304 and a storage server 306. The storage server 306, described further below, is configured to control storage of data and access to data that is located on a set 308 of interconnected storage volumes or disks 310. It is noted that the terms "storage volumes" and "disks" can be used interchangeably herein, without limiting the term "storage volumes" to disks. The term "storage volumes" can include any type of storage media, such as tapes or non-volatile memory.

Each of the devices attached to the network 302 includes an appropriate conventional network interface connection (not shown) for communicating over the network 302 using a communication protocol, such as Transport Control Protocol/Internet Protocol (TCP/IP), User Datagram Protocol (UDP), Hyper Text Transport Protocol (HTTP), Simple Network Management Protocol (SNMP), or Virtual Interface (VI) connections.

Storage Server

Figure 4:
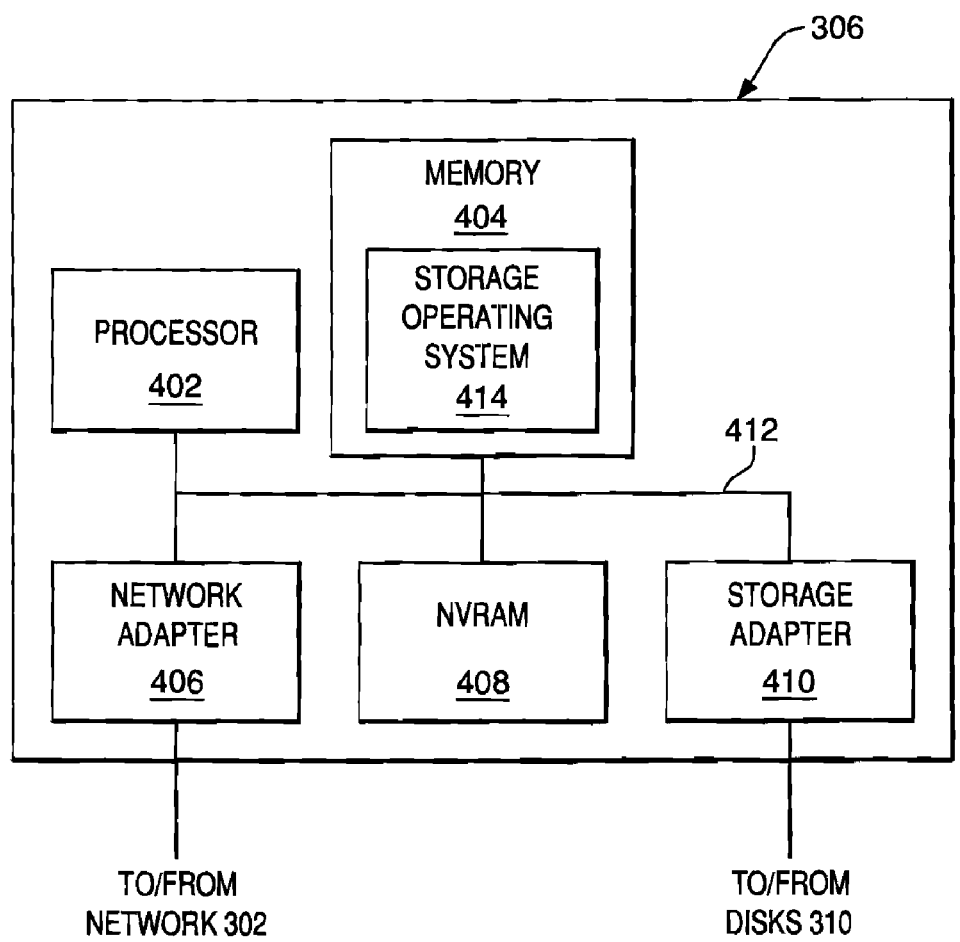
FIG. 4 is a block diagram of the storage server shown in FIG. 3.

FIG. 4 is a detailed block diagram of an exemplary storage server ("filer") 306. It will be understood by one skilled in the art that the inventive concepts described herein apply to any type of storage server, wherever implemented, including on a special-purpose computer, a general-purpose computer, or a standalone computer.

The storage server 306 includes a processor 402, a memory 404, a network adapter 406, a nonvolatile random access memory (NVRAM) 408, and a storage adapter 410, all of which are interconnected by a system bus 412. Contained within the memory 404 is a storage operating system 414 that implements a file system to logically organize the information as a hierarchical structure of directories and files on the disks 310. In an exemplary embodiment, the memory 404 is addressable by the processor 402 and the adapters 406, 410 for storing software program code. The operating system 414, portions of which are typically resident in the memory 404 and executed by the processing elements, functionally organizes the filer 306 by invoking storage operations in support of a storage service implemented by the filer.

The network adapter 406 includes mechanical, electrical, and signaling circuitry needed to connect the filer 306 to clients 304 over the network 302. The clients 304 may be general-purpose computers configured to execute applications, such as database applications. Moreover, the clients 304 may interact with the filer 306 in accordance with a client/server information delivery model. That is, the client 304 requests the services of the filer 306, and the filer 306 returns the results of the services requested by the client 304 by exchanging packets defined by an appropriate networking protocol.

The storage adapter 410 interoperates with the storage operating system 414 and the disks 310 of the set of storage volumes 308 to access information requested by the client 304. The storage adapter 410 includes input/output (I/O) interface circuitry that couples to the disks 310 over an I/O interconnect arrangement, such as a Fibre Channel link. The information is retrieved by the storage adapter 410 and, if necessary, is processed by the processor 402 (or the adapter 410 itself) prior to being forwarded over the system bus 412 to the network adapter 406, where the information is formatted into appropriate packets and returned to the client 304.

In one exemplary implementation, the filer 306 includes a non-volatile random access memory (NVRAM) 408 that provides fault-tolerant backup of data, enabling the integrity of filer transactions to survive a service interruption based upon a power failure or other fault.

Storage Operating System

To facilitate the generalized access to the disks 310, the storage operating system 414 implements a write-anywhere file system that logically organizes the information as a hierarchical structure of directories and files on the disks. As noted above, in an exemplary embodiment described herein, the storage operating system 414 is the NetApp® Data ONTAP® operating system available from Network Appliance, Inc., that implements the WAFL® file system. It is noted that any other appropriate file system can be used, and as such, where the terms "WAFL®" or "file system" are used, those terms should be interpreted broadly to refer to any file system that is adaptable to the teachings of this invention.

Figure 5:
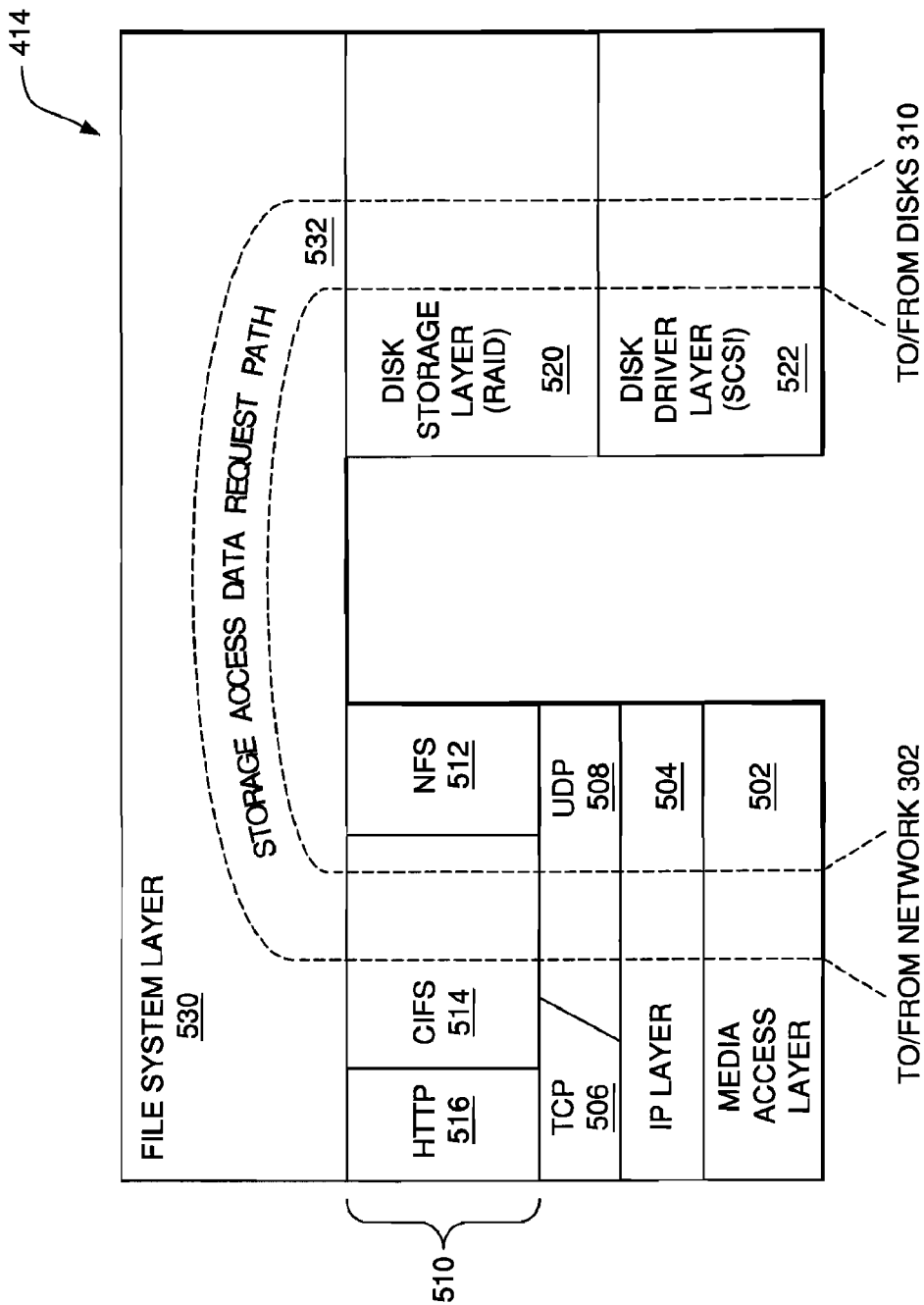
FIG. 5 is a block diagram of the storage operating system shown in FIG. 4.

Referring now to FIG. 5, the storage operating system 414 includes a series of software layers, including a media access layer 502 of network drivers (e.g., an Ethernet driver). The storage operating system 414 further includes network protocol layers, such as an Internet Protocol (IP) layer 504 and its supporting transport mechanisms, a Transport Control Protocol (TCP) layer 506 and a User Datagram Protocol (UDP) layer 508.

A file system protocol layer 510 provides multi-protocol data access and includes support for the Network File System (NFS) protocol 512, the Common Internet File System (CIFS) protocol 514, and the Hyper Text Transfer Protocol (HTTP) 516. In addition, the storage operating system 414 includes a disk storage layer 520 that implements a disk storage protocol, such as a redundant array of independent disks (RAID) protocol, and a disk driver layer 522 that implements a disk access protocol such as, e.g., a Small Computer System Interface (SCSI) protocol.

Bridging the disk software layers 520-522 with the network and file system protocol layers 502-516 is a file system layer 530. Generally, the file system layer 530 implements a file system having an on-disk format representation that is block-based using data blocks and inodes to describe the files.

In the storage operating system 414, a data request path 532 between the network 302 and the disk 310 through the various layers of the operating system is followed. In response to a transaction request, the file system layer 530 generates an operation to retrieve the requested data from the disks 310 if the data is not resident in the filer's memory 404. If the data is not in the memory 404, then the file system layer 530 indexes into an inode file using the inode number to access an appropriate entry and retrieve a logical volume block number. The file system layer 530 then passes the logical volume block number to the disk storage layer 520. The disk storage layer 520 maps the logical number to a disk block number and sends the disk block number to an appropriate driver (for example, an encapsulation of SCSI implemented on a Fibre Channel disk interconnection) in the disk driver layer 522. The disk driver accesses the disk block number on the disks 310 and loads the requested data in the memory 404 for processing by the filer 306. Upon completing the request, the filer 306 (and storage operating system 414) returns a reply, e.g., an acknowledgement packet defined by the CIFS specification, to the client 304 over the network 302.

It is noted that the storage access request data path 532 through the storage operating system layers described above may be implemented in hardware, software, or a combination of hardware and software. In an alternate embodiment of this invention, the storage access request data path 532 may be implemented as logic circuitry embodied within a field programmable gate array (FPGA) or in an application specific integrated circuit (ASIC). This type of hardware implementation increases the performance of the storage services provided by the filer 306 in response to a storage system request issued by a client 304.

Detecting a Data Shift Corruption Event

Figure 1:
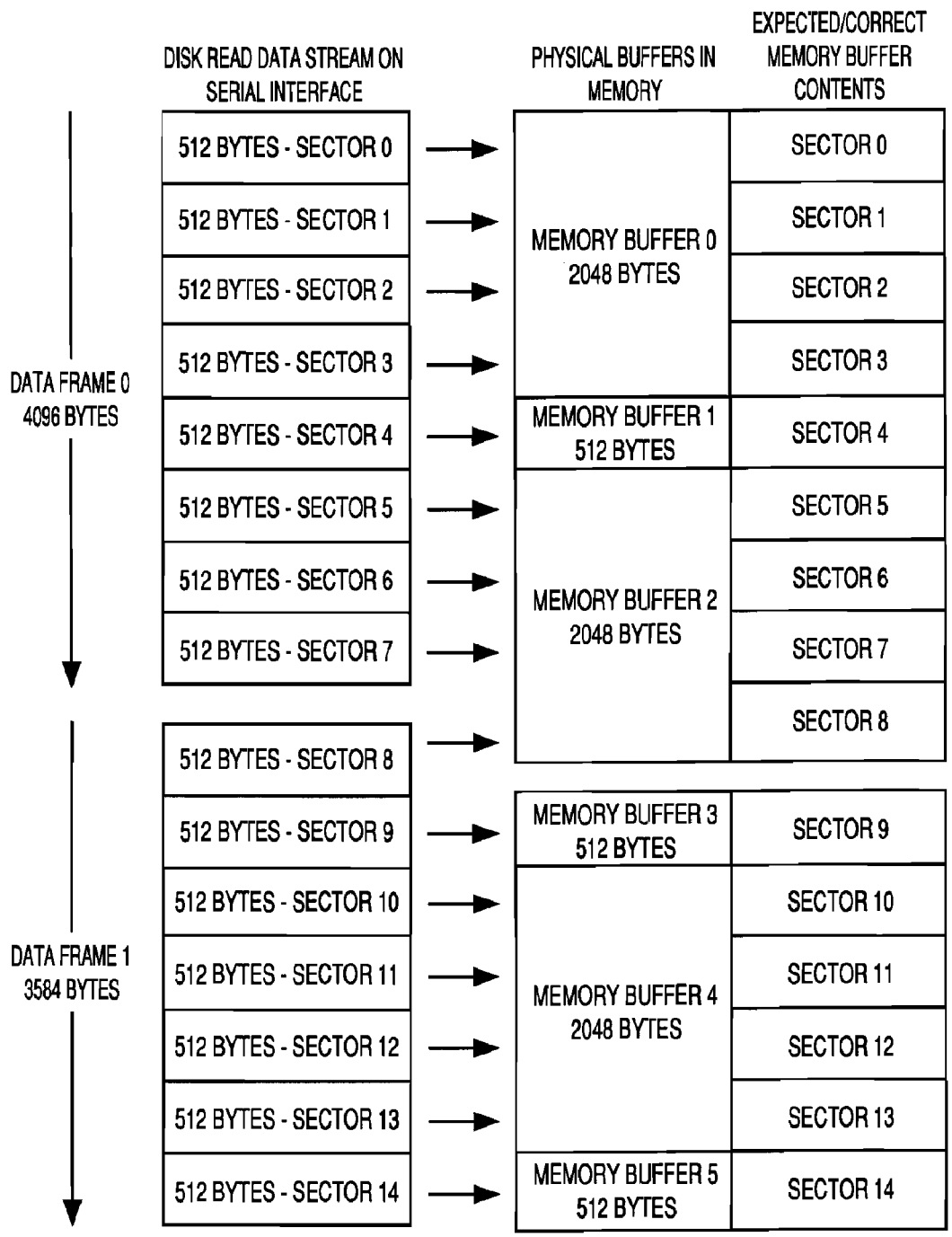
FIG. 1 is a diagram of a normal read operation into memory buffers.
Figure 2:
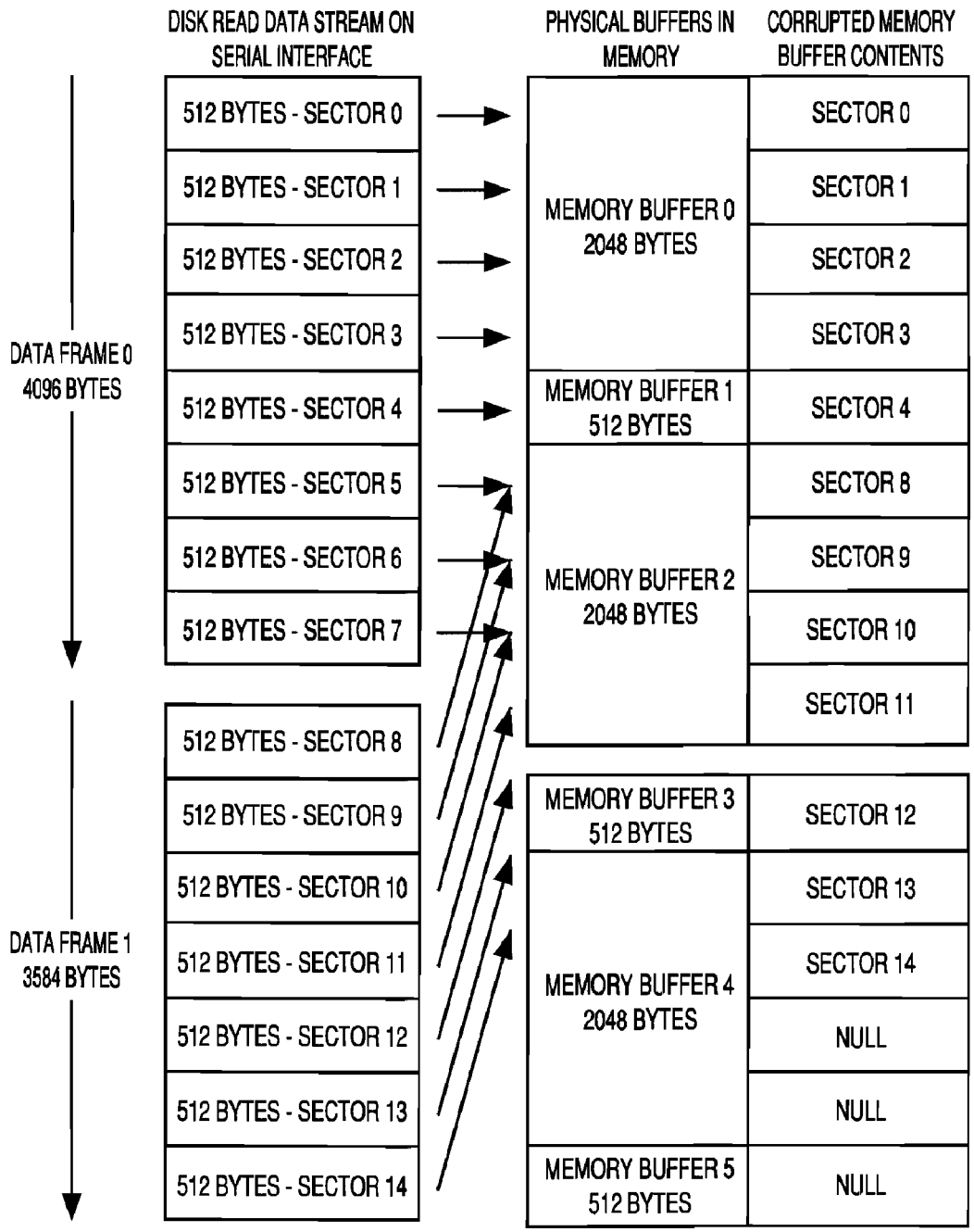
FIG. 2 is a diagram of a read operation resulting in an upward shift event that does not place the read data into the proper memory buffers.

If prior to starting the read operation shown in FIG. 2, buffer #5 had been seeded, the corruption illustrated in FIG. 2 could have been detected by virtue of the seed pattern not being overwritten by the data read from the disk. The seed pattern consists of a sequence of known values placed into the last few bytes of the buffer (i.e., to "seed" the buffer) to detect whether some sort of buffer-related data read error has occurred. If the seed pattern is still present in the buffer after the read has completed, it is likely that an error has occurred, because if the read had performed as expected, the seed pattern would have been overwritten by the read data. Only the end of the buffer is seeded, as this reduces the computational overhead required to seed the buffer and to check the buffer after the read I/O has completed.

Figure 6:
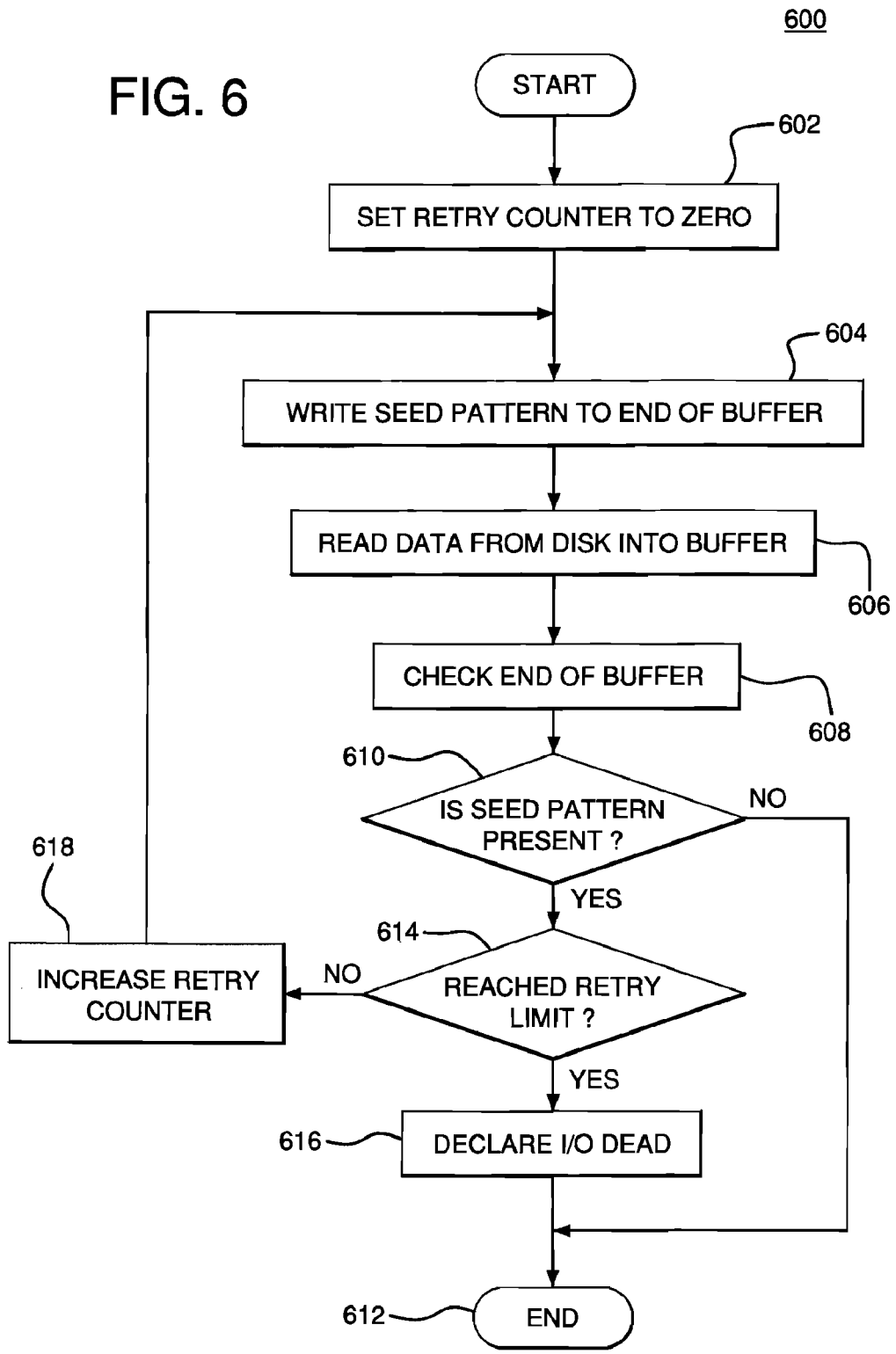
FIG. 6 is a flowchart of a method to seed a memory buffer and detect whether an upward shift event has occurred.

FIG. 6 is a flowchart of a method 600 to seed a memory buffer and detect whether an upward shift event has occurred. It is noted that the method 600 executes as a process on the filer 306 and can be implemented in a network attached storage (NAS) environment, a storage area network (SAN) environment, or any type of storage system.

The method 600 begins by setting a retry counter to zero (step 602). The retry counter is used to count the number of retries that the data is read from the disk such that if there is a more serious error (e.g., a physical disk error), the method does not get caught in an infinite loop to retry the read I/O. A seed pattern is written to the end of the buffer (step 604). Determining the seed pattern is discussed in detail in connection with FIG. 7.

Data is read from a disk into the buffer based on the I/O request (step 606). After the data is read into the buffer, the end of the buffer is checked for the seed pattern (step 608). If the seed pattern is not present (step 610), this indicates that the seed pattern was overwritten by the read data, the method terminates (step 612).

If the seed pattern is present (step 610), meaning that the read data did not fill the buffer based on the I/O request, a check is made whether the retry limit has been reached (step 614). In one embodiment, the retry limit is three retries. If the retry limit has been reached, the I/O is declared dead (step 616) and the method terminates (step 612). A "dead" I/O is handled by the filer per known procedures.

If the retry limit has not been reached (step 614), the retry counter is increased (step 618) and the read I/O is retried, beginning with writing a new seed pattern to the buffer (step 604) as described above.

Figure 7:
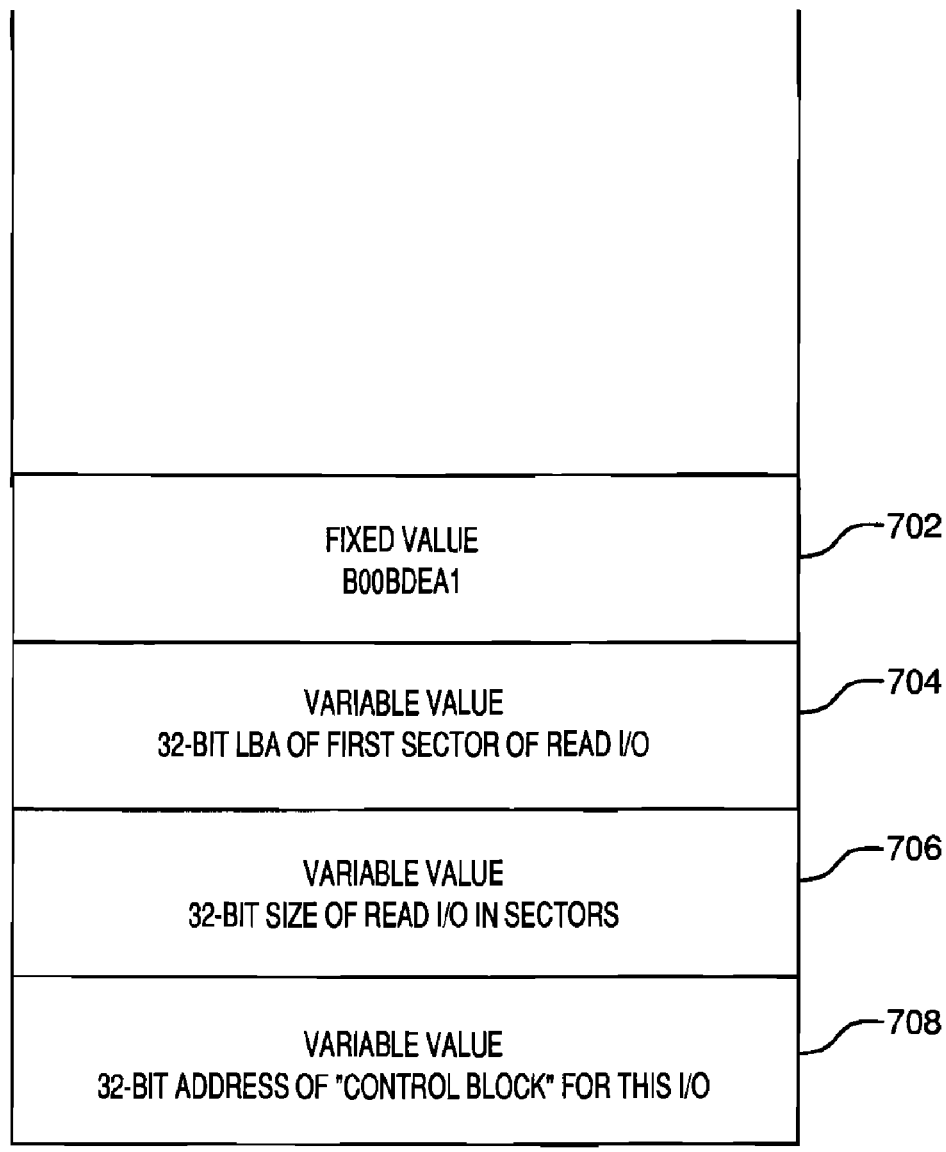
FIG. 7 is a diagram of an exemplary seed pattern used by the method shown in FIG. 6.

FIG. 7 is a diagram of an exemplary seed pattern that may be used by the method 600. Four 32-bit quantities (or "words") are written by the seeding procedure (step 604), and only those four 32-bit words are read back by the corruption detection procedure (steps 608-610), imparting a negligible performance impact. Three of the four 32-bit words are variable and are dependent on the parameters of the particular read command that initiated the operation, to provide reasonable discrimination and "false positive" avoidance. If by some coincidence the seed pattern did get written to the buffer as part of the read data, and a data shift corruption event is detected, a retry will result in a different seed value.

By using four words to seed the end of the buffer, the chances of having the last four words in the buffer exactly match the seed pattern (i.e., a false positive) are low. The choice of the seed pattern is important, in order to avoid a false positive match. As shown in FIG. 7, the four words include a fixed value 702, a first variable value 704 corresponding to the logical block address of the first sector of the read I/O, a second variable value 706 corresponding to the size of the read I/O in sectors, and a third variable value 708 corresponding to the address of the control block for the read I/O. In one embodiment, when performing a retry of the read I/O, the third variable value 708 will change (i.e., a different control block for the read I/O will be used), resulting in a different seed pattern.

One skilled in the art would recognize that any values relating to the specific I/O request could be used, such that a unique seed pattern is created that would not be a common part of a data stream. For example, the fixed value 702 shown is only exemplary; any value that is not commonly part of a data stream could be used.

It is also noted that a different number of words can be used for the seed pattern. For example, two words, such as a fixed value and a control block number could be used. It is further noted that the performance difference in using two words for the seed pattern versus four words is negligible, but the likelihood of receiving a false positive match with fewer words increases as compared to using a four word seed pattern.

Figure 8:
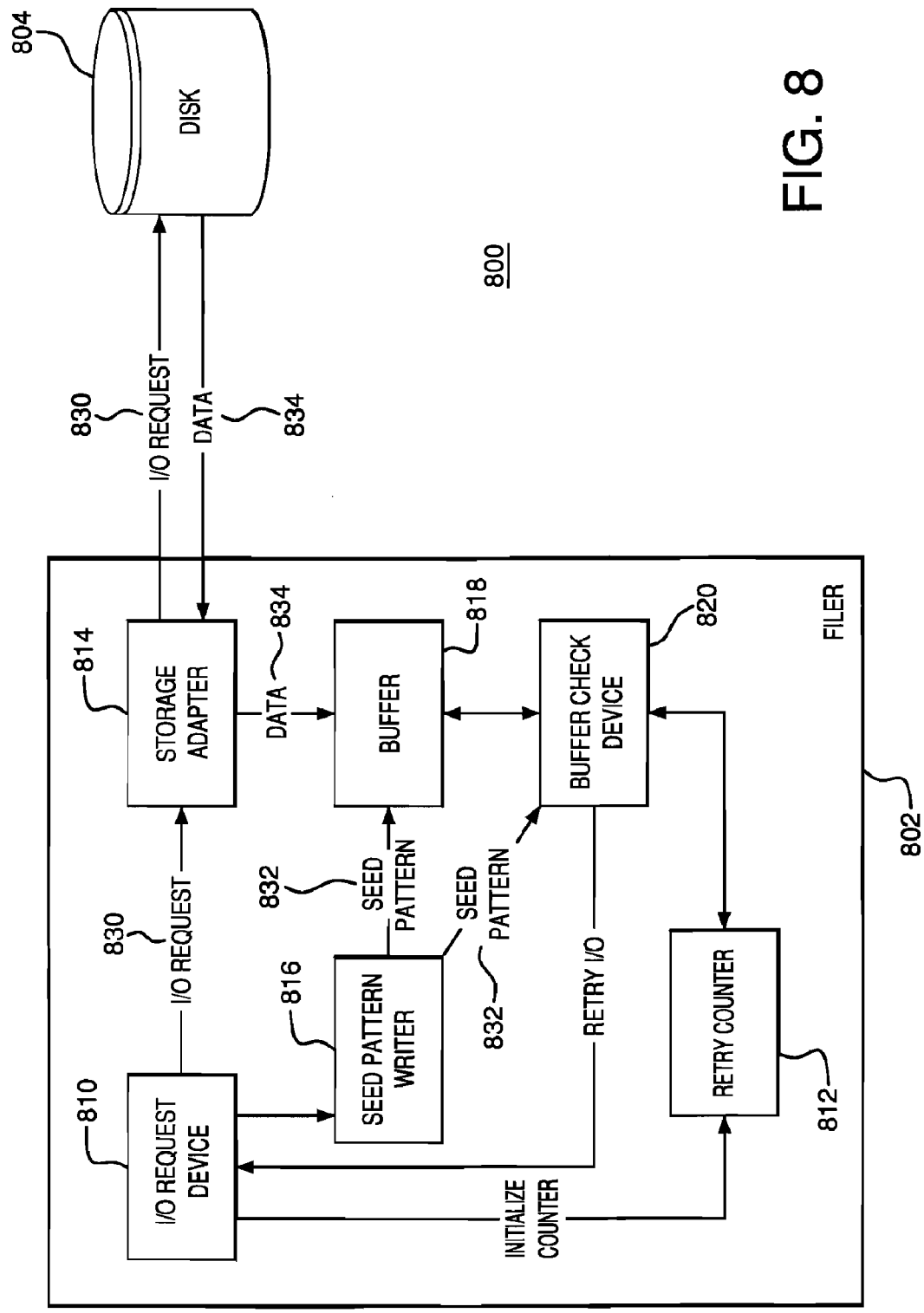
FIG. 8 is a block diagram of a system constructed to perform the method shown in FIG. 6.

FIG. 8 is a block diagram of a system 800 constructed to perform the method shown in FIG. 6. The system 800 includes a filer 802 and a disk 804. The filer 802 includes an I/O request device 810, a retry counter 812, a storage adapter 814, a seed pattern writer 816, a buffer 818, and a buffer check device 820.

In operation, the I/O request device 810 sends an I/O request 830 to the storage adapter 814. After sending the I/O request 830, the I/O request device 810 initializes the retry counter 812 and signals the seed pattern writer 816 to write a seed pattern 832 to the end of the buffer 818. The seed pattern 832 is also sent to the buffer check device 820 to be used in the comparison after the read I/O is performed. As noted above in connection with FIG. 7, the seed pattern includes several I/O-specific values, so the I/O request needs to be made before the seed pattern 832 can be written to the buffer 818.

The storage adapter 814 sends the I/O request 830 to the disk 804. The disk 804 returns data 834 satisfying the I/O request 830 to the storage adapter 814, which forwards the data 834 to the buffer 818. After the buffer 818 has received the data 834, the buffer check device 820 checks the end of the buffer 818 for the seed pattern 832. If the seed pattern 832 is not present at the end of the buffer 818, this indicates that the data 834 fully occupies the buffer (i.e., it was a successful read I/O).

If the buffer check device 820 detects the seed pattern 832 at the end of the buffer 818, this indicates that there was an upward shift event and that all of the data in the I/O request 830 was not properly retrieved from the disk 804. The buffer check device 820 increments the retry counter 812, clears the buffer 818, and signals the I/O request device 810 to retry the I/O. Upon retrying the I/O, a new seed pattern 832 is written to the buffer 818 and is sent to the buffer check device 820.

The present invention can be implemented in a computer program tangibly embodied in a computer-readable storage medium containing a set of instructions for execution by a processor or a general purpose computer; and method steps of the invention can be performed by a processor executing a program of instructions to perform functions of the invention by operating on input data and generating output data. Suitable processors include, by way of example, both general and special purpose processors. Typically, a processor will receive instructions and data from a ROM, a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method comprising:
   seeding a data buffer in a data storage system with a predetermined pattern;
   performing a data read operation, in which the data to be read is stored in the data buffer;
   examining the contents of the data buffer for the predetermined pattern; and
   determining whether an error occurred during the read operation based on whether the predetermined pattern is detected in the data buffer, including
   if the predetermined pattern is detected in the data buffer, then declaring the data read operation as unsuccessful and repeating the data read operation; and
   if the predetermined pattern is not detected in the data buffer, then declaring the data read operation as successful.

2. The method according to claim 1, wherein the seeding step includes seeding an end of the data buffer with the predetermined pattern.

3. The method according to claim 2, wherein the examining step includes examining the end of the data buffer for the predetermined pattern.

4. The method according to claim 1, wherein the data read operation is retried for a predetermined number of times if the data read operation is unsuccessful.

5. The method according to claim 4, wherein if the data read operation is retried for the predetermined number of times without success, then declaring the data read operation dead.

6. The method according to claim 4, wherein the predetermined pattern is different for each retry of the data read operation.

7. The method according to claim 1, wherein the predetermined pattern is two words in length.

8. The method according to claim 7, wherein one word is a fixed value and the other word is a variable value.

9. The method according to claim 8, wherein the variable value is an address of a control block for the data read operation.

10. The method according to claim 8, wherein the variable value is a logical block address of a first sector of the data read operation.

11. The method according to claim 8, wherein the variable value is a size of the data read operation in sectors.

12. The method according to claim 1, wherein the predetermined pattern is four words in length.

13. The method according to claim 12, wherein one word is a fixed value and the other three words are variable values.

14. The method according to claim 13, wherein one of the variable values is a logical block address of a first sector of the data read operation.

15. The method according to claim 13, wherein one of the variable values is a size of the data read operation in sectors.

16. The method according to claim 13, wherein one of the variable values is an address of a control block for the data read operation.

17. The method according to claim 1, wherein a first portion of the predetermined pattern is a fixed value and a second portion of the predetermined pattern is a variable value.

18. A computer-readable storage medium storing a set of instructions for execution by a computer, the set of instructions comprising:
   a seeding code segment for seeding a data buffer in a data storage system with a predetermined pattern;
   a reading code segment for performing a data read operation, in which the data to be read is stored in the data buffer;
   an examining code segment for examining the contents of the data buffer for the predetermined pattern;
   a declaring code segment for determining whether an error occurred during the read operation based on whether the predetermined pattern is detected in the data buffer, including declaring the data read operation as unsuccessful if the predetermined pattern is detected in the data buffer and declaring the data read operation as successful if the predetermined pattern is not detected in the data buffer; and
   a retrying code segment for retrying the data read operation if the data read operation was unsuccessful.

19. The storage medium according to claim 18, wherein the seeding code segment seeds the data buffer with a different predetermined pattern on each retry of the data read operation.

20. The storage medium according to claim 18, wherein the repeating code segment includes a limiting code segment for limiting a number of times that the data read operation is performed if the data read operation is unsuccessful.

21. The computer-readable storage medium according to claim 18, wherein a first portion of the predetermined pattern is a fixed value and a second portion of the predetermined pattern is a variable value.

22. A storage server in a data storage system, the storage server comprising:
   an input/output (I/O) request device, configured to generate an I/O request;
   a storage adapter coupled to communicate with said I/O request device, said storage adapter configured to forward the I/O request to a storage device and to receive data from the storage device;
   a data buffer coupled to communicate with said storage adapter, said data buffer configured to store data received by said storage adapter;
   a seed pattern writer coupled to communicate with said I/O request device and said data buffer, said seed pattern writer configured to write a seed pattern to said data buffer upon instruction from said I/O request device; and
   a buffer check device coupled to communicate with said I/O request device, said data buffer, and said seed pattern writer, said buffer check device configured to examine the contents of said data buffer to determine whether the seed pattern is present in said data buffer and to determine whether an error occurred during the read operation based on whether the predetermined pattern was detected in the data buffer.

23. The storage server according to claim 22, wherein if said buffer check device determines that the seed pattern is present in said data buffer, said buffer check device is further configured to clear said data buffer and to instruct said I/O request device to retry the data read operation.

24. The storage server according to claim 23, wherein said seed pattern writer is configured to write a different seed pattern to said data buffer on each retry of the data read operation.

25. The storage server according to claim 22, further comprising:
   a retry counter communicating with said I/O request device and said buffer check device, said retry counter configured to count a number of times that the data read operation is retried if the data read operation is unsuccessful.

26. The storage server according to claim 25, wherein said buffer check device uses the count maintained by said retry counter to determine whether to declare a data read operation dead after a predetermined number of retries.

27. The storage server according to claim 22, wherein a first portion of the predetermined pattern is a fixed value and a second portion of the predetermined pattern is a variable value.

* * * * *